United States Patent [19]

McCain

[11] 4,413,839

[45] Nov. 8, 1983

[54] MUD FLAP STABILIZER DEVICE

[76] Inventor: Thomas S. McCain, 9325 Georgia, Kansas City, Kans. 66109

[21] Appl. No.: 301,477

[22] Filed: Sep. 14, 1981

[51] Int. Cl.³ .............................................. B62D 25/16
[52] U.S. Cl. ................................. 280/154.5 R; 362/80
[58] Field of Search .................... 280/154.5 R, 152 R, 280/154.5 A; 116/28 R; 362/80

[56] References Cited

U.S. PATENT DOCUMENTS

| D. 150,764 | 8/1948 | Golden | 280/154.5 R X |
|---|---|---|---|
| 2,106,992 | 2/1938 | Bahr | 280/154.5 R X |
| 2,758,401 | 8/1956 | Wilson | 280/154.5 R |
| 3,059,945 | 10/1962 | Robb | 280/154.5 R |
| 3,091,478 | 5/1963 | Ambli | 280/154.5 R |
| 3,195,920 | 7/1965 | Knisely et al. | 280/154.5 R |
| 3,244,432 | 4/1966 | Ambli | 280/154.5 R |
| 3,319,976 | 5/1967 | Eckermann | 280/154.5 R |
| 3,473,825 | 10/1969 | Ochs | 280/154.5 R |
| 3,549,171 | 12/1970 | Katz | 280/154.5 R |
| 3,713,669 | 1/1973 | Evans | 280/154.5 R |
| 3,830,520 | 8/1974 | Kelly | 280/154.5 R |
| 4,103,918 | 8/1978 | Salden | 280/154.5 R |

FOREIGN PATENT DOCUMENTS 591229  6/1925  France ........................ 280/154.5 A Primary Examiner—Joseph F. Peters, Jr.
Assistant Examiner—Michael Mar
Attorney, Agent, or Firm—Litman, Day & McMahon

[57] ABSTRACT

A mud flap stabilizer device is for use with an elongate, generally rectangular mud flap formed of flexible material and swingably supported adjacent its upper end from a vehicle body rearwardly of and in close proximity to a vehicle wheel mounted tire. The stabilizer device includes a frame body with a hanger member extending upwardly therefrom and connected to a normally horizontally extending bar member in a depending relationship. The bar member is swingably mounted to the vehicle body rearwardly of the mud flap whereby the frame body is positioned against the mud flap. Rotation limiting arms control swinging movement of the frame body to limit movement of the mud flap. Illumination members such as reflectors or electrical lamps are connected to the frame body for visual enhancement.

4 Claims, 5 Drawing Figures

U.S. Patent  Nov. 8, 1983  Sheet 2 of 2  4,413,839
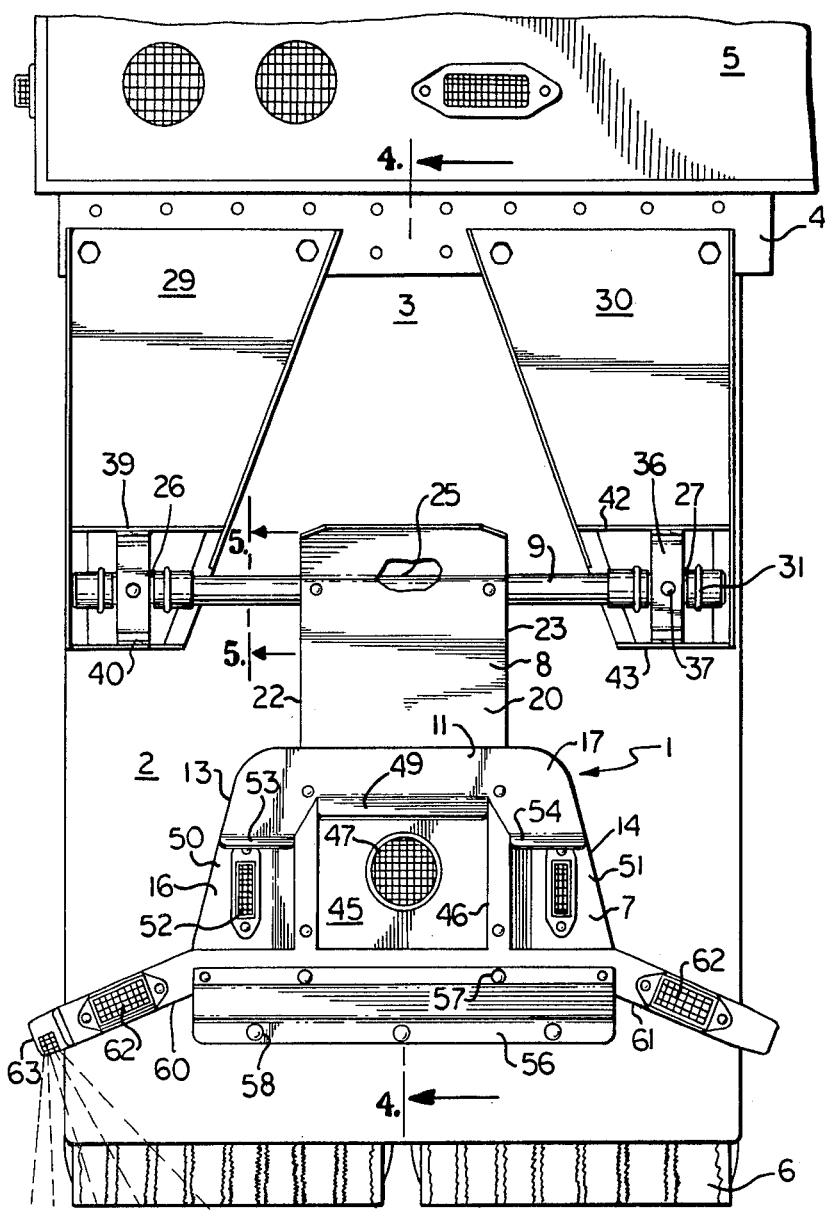
Fig.3.
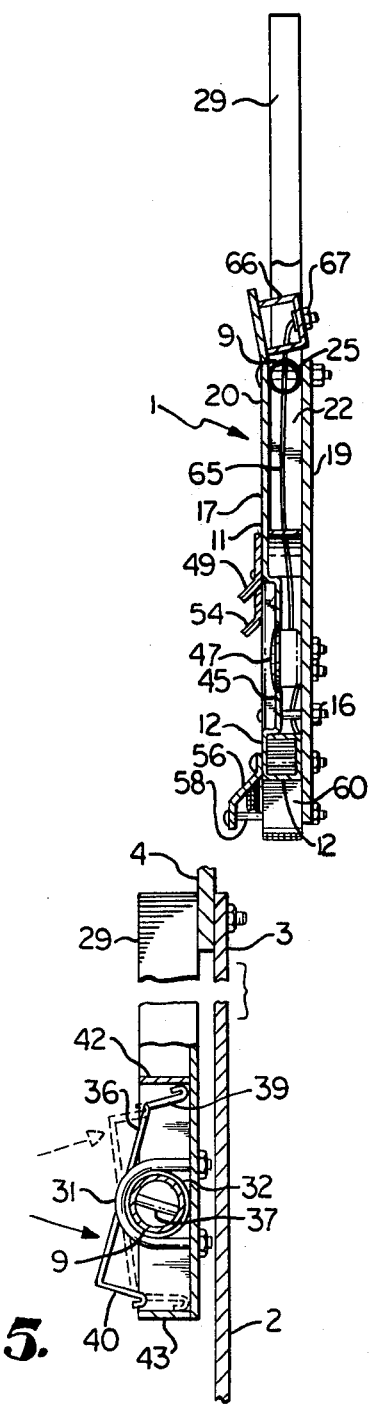
Fig.4.
Fig.5.

MUD FLAP STABILIZER DEVICE

This invention relates to mud flaps or mudguards in general for vehicles, and in particular, to a stabilizer device therefor.

BACKGROUND OF THE INVENTION

Virtually all states have regulations requiring that large trucks or trailers employ mud flaps or mudguards mounted aft of the rear wheels to protect following motorists and pedestrians from debris such as rain, mud and stones picked up by the tires. This debris would otherwise be thrown out from the tire and hinder and perhaps even injure the motorist or pedestrian.

The employed mudguards or mud flaps are commonly elongate, generally rectangular flaps formed of flexible material mounted by its upper end from the vehicle body rearwardly of and in close proximity to the vehicle wheel mounted tire. The material forming the mud flap or guard is generally either a relatively stiff plastic material or a synthetic rubber with a strengthening interior fabric or cords. In either material, the mud flap or guard must be relatively stiff so that it does not tend to blow upwardly in the slipstream or flap excessively. When the mudguards or flaps are in a position other than substantially vertical, the splashing effect created by the moving wheels is not effectively controlled. Further, any continuous flexing movement of the mudguard or flap weakens the material thereof to the extent that its useful life is substantially reduced by material fatigue.

Further, particularly during darkness, the rear end of a truck or trailer are often insufficiently illuminated and passing or trailing vehicles may not be able to precisely discern the outline of the truck or trailer, thereby leading to potentially disastrous effects. For example, the rear wheels of the truck or trailer may be insufficiently illuminated, particularly during a dark night whereby a passing motorist tends to drift too close and a collision occurs, often at a high rate of speed.

OBJECTS OF THE INVENTION

Principal objects of the present invention are: to provide a stabilizing device for mudguards or mud flaps of vehicles such as trailers or tractors; to provide such a stabilizing device which limits the swinging movement of the mudguard or mud flap; to provide such a stabilizing device having outwardly extending arms terminating adjacent the side margins of the mud flap to prevent curling thereof; to provide such a stabilizer device having illumination means providing visual enhancement of the rear end and wheel areas of the truck or trailer; to provide such a stabilizing device having overhanging flanges to protect the illumination means; to provide such a stabilizer device having interior passages to protect electrical wiring for the illumination means; and to provide such a stabilizing device which is sturdy and efficient in use and particularly well adapted for the intended purpose.

Other objects and advantages of this invention will become apparent from the following description taken in connection with the accompanying drawings wherein are set forth, by way of illustration and example, a certain embodiment of this invention.

DESCRIPTION OF THE DRAWINGS

FIG. 3 is an elevational view of the stabilizer device in association with the vehicle rear end and tires.

FIG. 4 is a longitudinal sectional view of the stabilizer device taken along lines 4—4, in FIG. 3.

FIG. 5 is an enlarged fragmentary view of a swing mounting means and rotation limiting means of the stabilizer device.

DESCRIPTION OF THE PREFERRED EMBODIMENT

Figure 1:
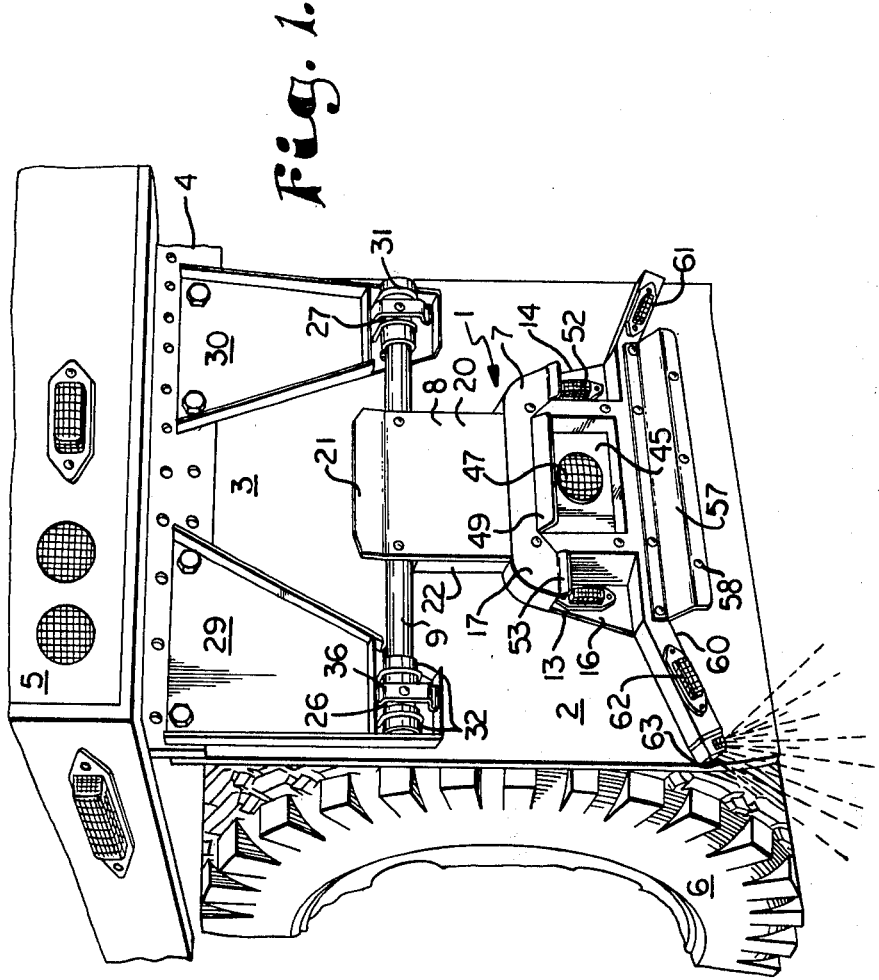
FIG. 1 has is a perspective view of a mud flap stabilizer device embodying the present invention and shown in association with the rear end of a trailer and in close proximity to a vehicle wheel mounted tire.
Figure 2:
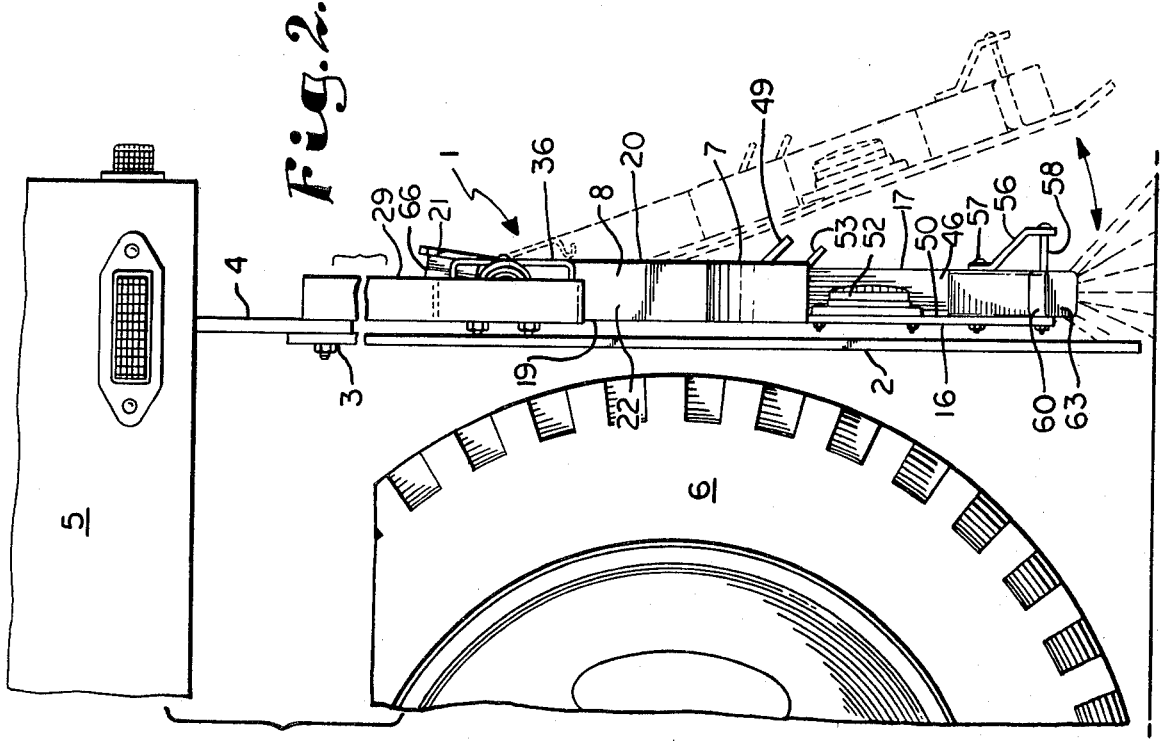
FIG. 2 is a side elevational view of the mud flap stabilizer device in association with the vehicle rear end and tire.

As required, a detailed embodiment of the present invention is disclosed herein, however, it is to be understood that the disclosed embodiment is merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a mud flap stabilizer device embodying the present invention. The stabilizer device 1 is intended for use with an elongate mud flap or mudguard 2, such as of rectangular shape and formed of flexible material. The mud flap 2 has an upper end or margin 3 mounted to a cross beam 4 generally at a rear end portion of a vehicle such as a truck or trailer 5. The mud flap 2 is positioned in close proximity to a vehicle wheel mounted tire or tires 6 when the vehicle employs dual rear wheels.

The stabilizer device 1 generally comprises a frame body 7 with a hanger member 8 extending upwardly therefrom. The hanger member 8 is secured to a normally horizontally extending bar member 9 which is swingably mounted to the vehicle body rearwardly of the mud flap 2 to position the frame body 7 thereagainst. A rotation limiting means is associated with the mounting means of the bar member 9 for controlling swinging movement. Illumination means are connected to the frame body 7 for visual enhancement thereof.

In the illustrated example, the frame body 7 is generally trapezoidally shaped with upper and lower margins 11 and 12 and opposite, converging side margins 13 and 14. The frame body 7 is comprised of a backing member 16, such as in the form of a plate, and a front member 17 also generally planar. The backing and front members are preferably formed of a sturdy material, such as galvanized sheet metal, formed into walls to provide the side margins 13 and 14. An upwardly extending portion 19 of the backing member 16 extends to the bar member 9 and is situated at one side thereof. A second upwardly extending portion 20 extends from the front member 17 in parallel relation to the portion 19 to the other side of the bar member 9. An outwardly curved tang or flange 21 protrudes above the bar member 9. Opposite side walls 22 and 23 close the hanger member 8.

In the illustrated example, the bar member 9 is an elongate pipe having a medial portion 25 to which the hanger member 8 is affixed and has opposite ends 26 and 27 connected to portions extending from the cross beam 4 of the trailer 5 to suspend the stabilizer device 1 therefrom. Spaced, triangularly shaped braces 29 and 30 are fastened to the trailer cross beam 4 and extend downwardly therefrom. The braces 29 and 30 are arranged in pairs adjacent each side of the truck or trailer 5 and in proximity to the rear wheel or dual rear wheel set. The bar member ends 26 and 27 are respectively connected to lower ends of the braces 29 and 30 as by "U" bolts 31 extending about the end 26 or 27 with a tubular bushing 32 therebetween to permit rotation of the bar member 9 relative to the brace 29 or 30. To provide smooth rotational bearing support, a pair of "U" bolt and bushing mounts are provided at each of the bar ends 26 and 27 with a space retained between the paired bushings 32 for mounting of the rotational limiting means.

In the illustrated example, respective arm members 36 are secured at the ends 26 and 27 in transverse orientation to the longitudinal and rotational axis of the bar member 9 at the ends 26 and 27 as by a fastener 37 extending therethrough. Each of the arm members 36 has upper and lower inturned ends 39 and 40, FIG. 5, which selectively abut the surface of the respective breaks 29 or 30 to limit rotation of the bar member 9. The lower inturned end 40 limits rotation of the stabilizer device 1 toward the tires 6 to only slightly inward of a straight vertical position whereas the upper inturned end 39 limits rotation to about 15 to 20 degrees deflection away from the tire 6 to control outward swinging of the mud flap or mudguard 2. To prevent damage to the movement limiting means and rotational means lower flanges extend outwardly from the lower portions of the braces 29 and 30.

The frame body 7 includes illumination means such as reflectors or electric lamps and, in the illustrated example, includes a plurality of electric lamps installed thereon for visual enhancement of the mud flap stabilizer device 1 for backing of the truck or trailer 5 and for the benefit and safety of passing motorists. The frame body 7 has a recessed center area 45 defined by surrounding walls 46 extending from the front member 17 to the backing member 16. An electrical lamp 47 with an accompanying lamp base is affixed to the backing member 16 with suitable electrical wiring therefor routed through the frame body 7. The electrical lamp 47 preferably is wired to the truck or trailer electrical system so that the lamp 47 acts as a turn signal. An overhanging flap or flange 49 extends in protective relationship to the lamp 47 from the front member 17.

Positioned on opposite sides of the recessed center area 45 are side recessed areas 50 and 51, each with an electrical lamp 52 mounted thereon. Respective flanges 53 and 54 extend over the side recessed areas 50 and 51 also in protective relationship. Preferably, the electrical lamps 52 are switched on during hours of darkness to provide running lights for the truck or trailer 5.

Adjacent the lower margin 12 of the frame body 7 extends a bottom protective flange 56 secured to the frame body 7 as by fasteners 57 and having other fasteners 58 affixed to an outer portion of the flange 56 and maintaining spaced separation of the flange outer portion from the frame body 7. The bottom protective flange 56 provides protection for the stabilizer device 1 when backing the vehicle such as the truck or trailer 5 in the instance where the stabilizer device encounters a solid object, such as a loading dock.

Outward extending arm members 60 and 61 with respective arm end terminations protrude slightly beyond the side margin of the mudguard or flap 2, FIG. 3, to inhibit rearward curling of the flap. The exemplary arm members 60 and 61 are preferably composed of lengths of rectangular tubing for structural rigidity and have respective electrical lamps 62 mounted therein for service as running lights. The outward arm member 60 has an electrical lamp 63 mounted in the end thereof and directed downwardly for use as a backing light to illuminate the pavement and area immediately aft of the tires 6.

Preferably, electrical wiring for the lamps is routed through the interior of the frame body 7 and, in the illustrated example, the wires are fixed together in a wiring bundle 65 which passes upwardly through the frame body 7 and hanger member 8 between the front and backing members 16 and 17. The wiring bundle 65 extends through the bar member 9 and connects to a junction box 66 secured to the rear surface of the tang or flange 21. The junction box 66 has a plurality of terminals 67 for connection to the vehicle electrical wiring to route power to the respective running lights, turn signals and backing lamp.

To employ the mud flap stabilizing device 1, the braces 29 and 30 are secured to the vehicle and the rotary mounting means and rotational limiting means of the bar member 9 connected as described above. The hanger member 8 may be secured to the bar member 9 either before or after connection of the bar member 9 to the braces 29 and 30. Preferably, the braces 29 and 30 are selected so that the bottom of the stabilizer device is no lower than eight to ten inches above the pavement. Appropriate vehicle electrical wiring is connected to the proper terminals 67 at the junction box 66 for correct operation of the electrical lamps. The electrical lamps visually enhance the rear wheel and end area of the vehicle for the safety of other motorists and guidance of the vehicle operator while backing and the like. The turning and running lights of the stabilizer device 1 provide effective eye level indicators to passing traffic to enable motorists to avoid potentially disasterous collisions.

It is to be understood that while one form of this invention has been illustrated and described, it is not to be limited to the specific form or arrangement of parts herein described and shown, except in so far as such limitations are icluded in the following claims.

What is claimed and desired to secure by Letters Patent is:

1. A mud flap stabilizer device for use with an elongate, generally rectangular mud flap formed of flexible material, and being swingably supported adjacent its upper end from a vehicle body rearwardly of an in close proximity to a vehicle wheel mounted tire; said stabilizer device comprising:
 (a) a stabilizer frame body;
 (b) a hanger member extending upwardly from said frame body;
 (c) a normally horizontally extending bar member having opposing ends, said hanger member secured to said bar member whereby said frame body depends therefrom;
 (d) swing mounting means for connecting said bar member opposite ends to said vehicle body rearwardly of said mud flap to position said frame body thereagainst;

(e) rotation limiting means affixed to said bar member for controlling swinging movement of said frame body; and
(f) illumination means connected to said frame body for visual enhancement thereof;
(g) said frame body having spaced backing and front members providing an interior passage and closed by sidewalls;
(h) said illumination means includes electrical lights having electrical wiring routed through said passage for protection of said wiring.

2. The stabilizer device set forth in claim 1 including:
(a) arm members diverging from said frame body and of a length providing end portions terminating adjacent side margins of said mud flap;
(b) illumination means on at least one of said arm members; and
(c) said illumination means including a light directed downwardly for guiding backing movement of said vehicle.

3. The stabilizer device set forth in claim 1 wherein:
(a) said electrical lights are recessed in said front member; and
(b) said front member has sloping flanges extending therefrom over at least some of said electrical lights for protection thereof from moisture.

4. A mud flap stabilizer device for use with an elongate, generally rectangular mud flap formed of flexible material, and being swingably supported adjacent its upper end from a vehicle body rearwardly of and in close proximity to a vehicle wheel mounted tire; said stabilizer device comprising:
(a) a stabilizer frame body having spaced backing and front members providing an interior passage and closed by sidewalls;
(b) a hanger member extending upwardly from said frame body;
(c) a normally horizontally extending bar member having opposite ends, said hanger member secured to said bar member whereby said frame body depends therefrom;
(d) swing mounting means for connecting said bar member opposite ends to said vehicle body rearwardly of said mud flap to position said body backing member flatly thereagainst;
(e) rotation limiting means associated with said mounting means for controlling swinging movement of said frame body;
(f) arm members diverging from said frame body for engagement with said mud flap; said arm members respectively having ends terminating adjacent side margins of said mud flap; and
(g) illumination means secured to said frame body and said arm members for visual enhancement thereof and having electrical wiring therefor routed inside said frame body for protection of said wiring.

* * * * *